United States Patent
Shachar et al.

(10) Patent No.: US 11,909,735 B2
(45) Date of Patent: Feb. 20, 2024

(54) MULTI-CLOUD FRAMEWORK FOR AUTHENTICATION OF DATA REQUESTS

(71) Applicant: EMC IP Holding Company LLC, Hopkinton, MA (US)

(72) Inventors: Tomer Shachar, Omer (IL); Yevgeni Gehtman, Modi'in (IL); Maxim Balin, Gan Yavne (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 456 days.

(21) Appl. No.: 17/097,638

(22) Filed: Nov. 13, 2020

(65) Prior Publication Data

US 2022/0158995 A1  May 19, 2022

(51) Int. Cl.
*H04L 9/40* (2022.01)
*H04L 9/14* (2006.01)
*H04L 9/32* (2006.01)

(52) U.S. Cl.
CPC .......... *H04L 63/0876* (2013.01); *H04L 9/14* (2013.01); *H04L 9/3247* (2013.01)

(58) Field of Classification Search
None
See application file for complete search history.

(56) References Cited

U.S. PATENT DOCUMENTS

| 9,288,193 | B1 * | 3/2016 | Gryb ........................ G06F 21/44 |
| 2015/0244716 | A1 * | 8/2015 | Potlapally ........... H04L 63/0853 713/155 |

OTHER PUBLICATIONS

Bharadi, V.A et al., 2015, February. Online signature recognition using software as a service (SAAS) model on public cloud. In 2015 International Conference on Computing Communication Control and Automation (pp. 65-72). IEEE. (Year: 2015).*
Xue, K. et al., 2014. A dynamic secure group sharing framework in public cloud computing. IEEE Transactions on Cloud Computing, 2(4), pp. 459-470. (Year: 2014).*
https://link.springer.com/article/10.1186/s13673-020-00224-y.
https://www.okta.com/products/.
https://www.onelogin.com/blog/manage-multi-cloud-environments.

* cited by examiner

*Primary Examiner* — Luu T Pham
*Assistant Examiner* — Edward X Long
(74) *Attorney, Agent, or Firm* — Ryan, Mason & Lewis, LLP

(57) ABSTRACT

Techniques are provided for multi-cloud authentication of data requests. One method comprises obtaining, by a first authentication entity of a first cloud environment, from a service on the first cloud environment, a request for data stored by a second cloud environment; determining a signature for the service; verifying the determined signature for the service by requesting a signature for the service registered with a second authentication entity of the second cloud environment; requesting the data from the second authentication entity of the second cloud environment in response to the determined signature being verified; and providing the requested data to the service. The requested data from the second cloud environment may be encrypted with an encryption key, and the method may further comprise decrypting the requested data with a decryption key obtained from the second cloud environment. The signature for the service may be registered as part of a deployment of the service.

20 Claims, 11 Drawing Sheets

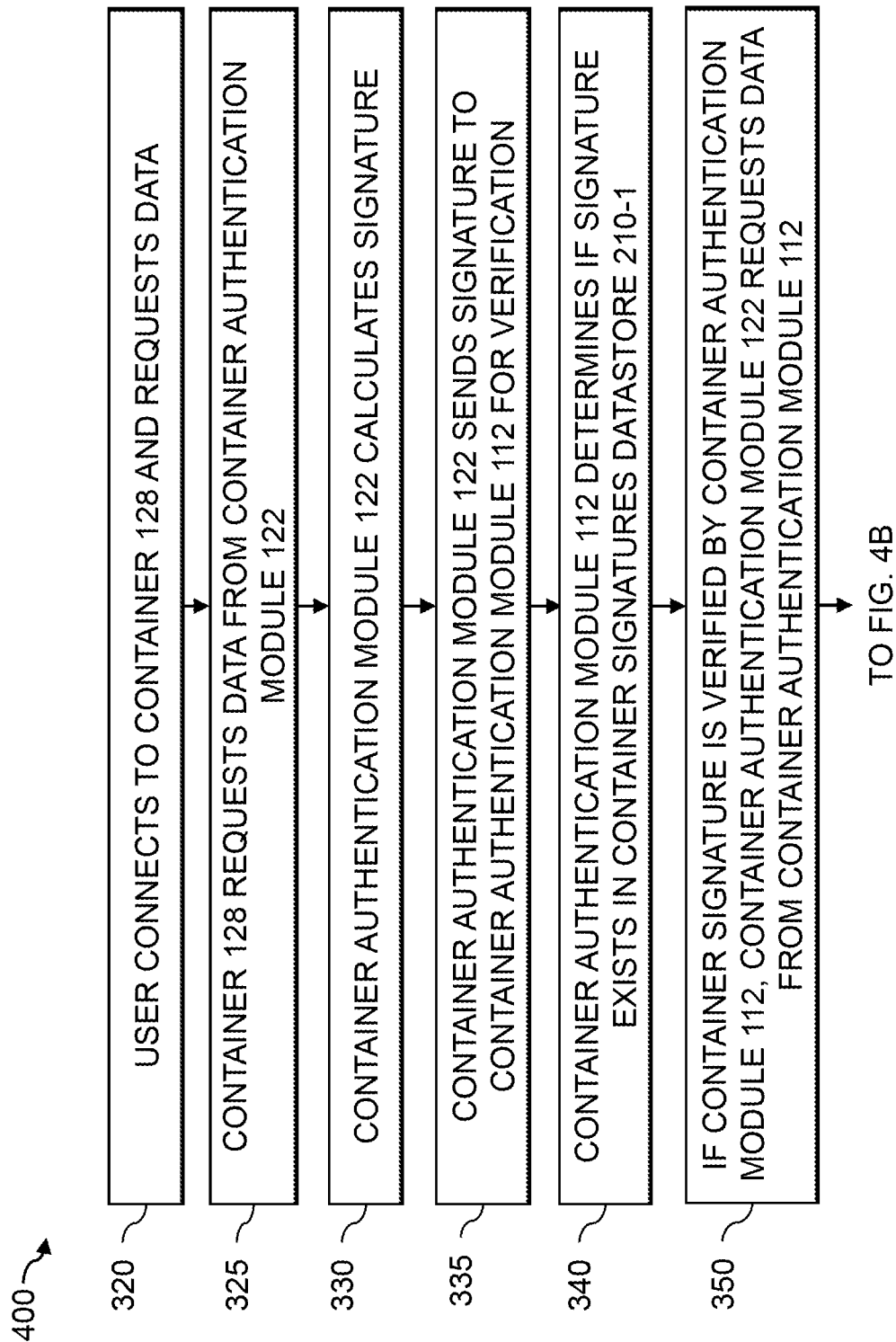

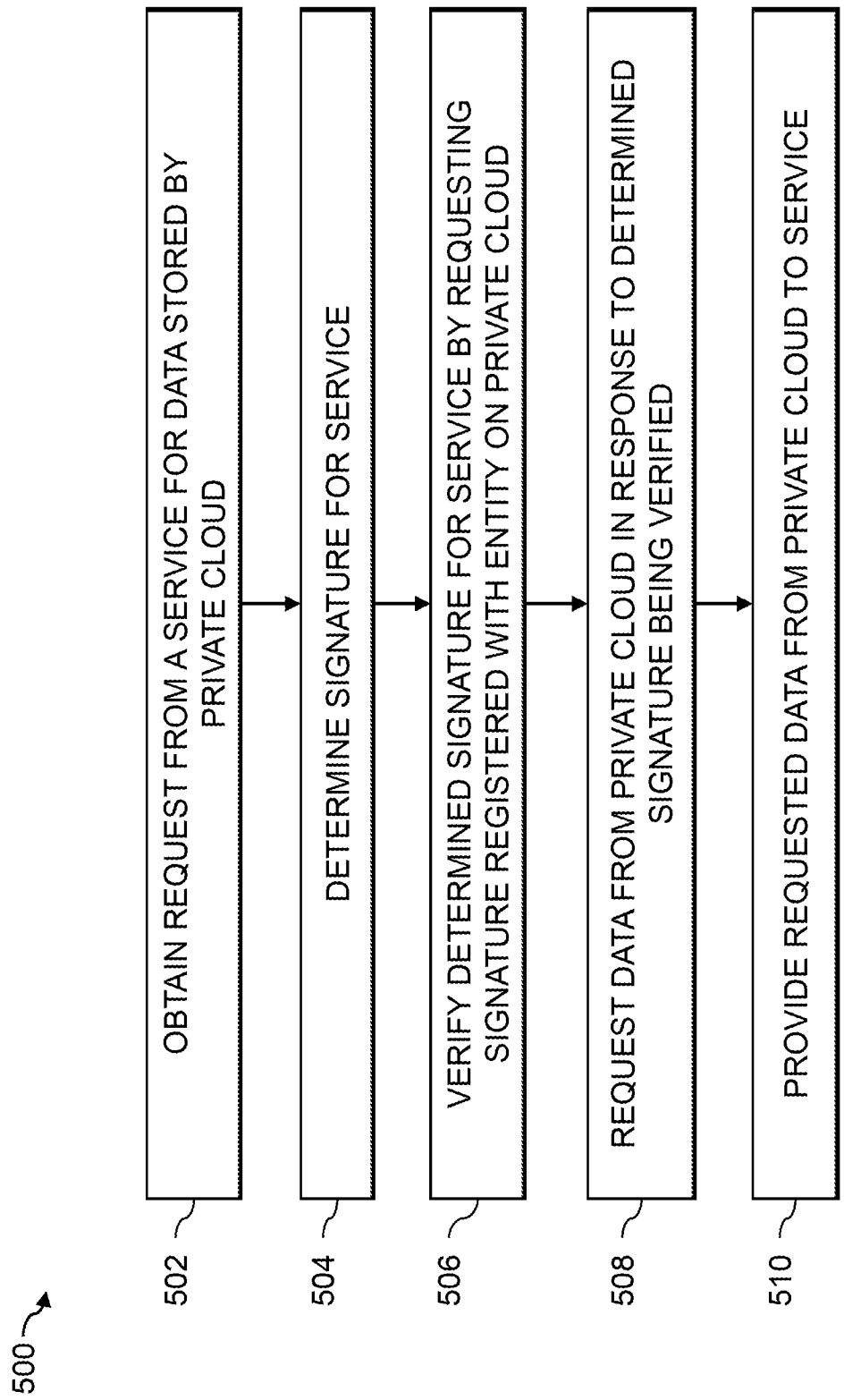

MULTI-CLOUD FRAMEWORK FOR AUTHENTICATION OF DATA REQUESTS

FIELD

The field relates generally to information processing systems, and more particularly to the protection of data in such information processing systems.

BACKGROUND

Data protection techniques are often employed to secure data in a cloud environment, typically using data protection functions provided by the cloud provider. Many organizations, however, do not trust requests from a public cloud to access sensitive information. Such organizations fear external threats from outside of a given public cloud environment and/or internal threats from within the provider of a given public cloud.

A need exists for improved techniques for protecting data in a cloud environment.

SUMMARY

In one embodiment, a method comprises obtaining, by a first authentication entity of a first cloud environment, from a service on the first cloud environment, a request for data stored by a second cloud environment; determining a signature for the service; verifying the determined signature for the service by requesting a signature for the service registered with a second authentication entity of the second cloud environment; requesting the data from the second authentication entity of the second cloud environment in response to the determined signature being verified; and providing the requested data to the service.

In some embodiments, the requested data from the second cloud environment is encrypted with an encryption key, and the method further comprises decrypting the requested data from the second cloud environment with a decryption key obtained from the second cloud environment. The signature for the service may be registered as part of a deployment of the service.

Other illustrative embodiments include, without limitation, apparatus, systems, methods and computer program products comprising processor-readable storage media.

BRIEF DESCRIPTION OF THE DRAWINGS

FIGS. 4A and 4B are flow diagrams illustrating an exemplary implementation of a process for multi-cloud authentication of data requests implemented in the cloud platforms of FIGS. 3A and 3B, according to some embodiments;

FIG. 5 is a flow diagram illustrating an exemplary implementation of a process for multi-cloud authentication of data requests, according to an illustrative embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for multi-cloud authentication of data requests.

In one or more embodiments, techniques are provided for the protection of data in a multi-cloud environment. Data is stored in a private cloud and a request for the data is authenticated in the private cloud platform (for example, by evaluating a previously registered signature for the requester, such as a service). Thus, a service on a public cloud can only obtain the data stored on the private cloud, in at least some embodiments, if the data request is authenticated in the private cloud. In this manner, data stored on the private cloud may be presented on the public cloud only to approved and/or verified entities or services.

Figure 1:
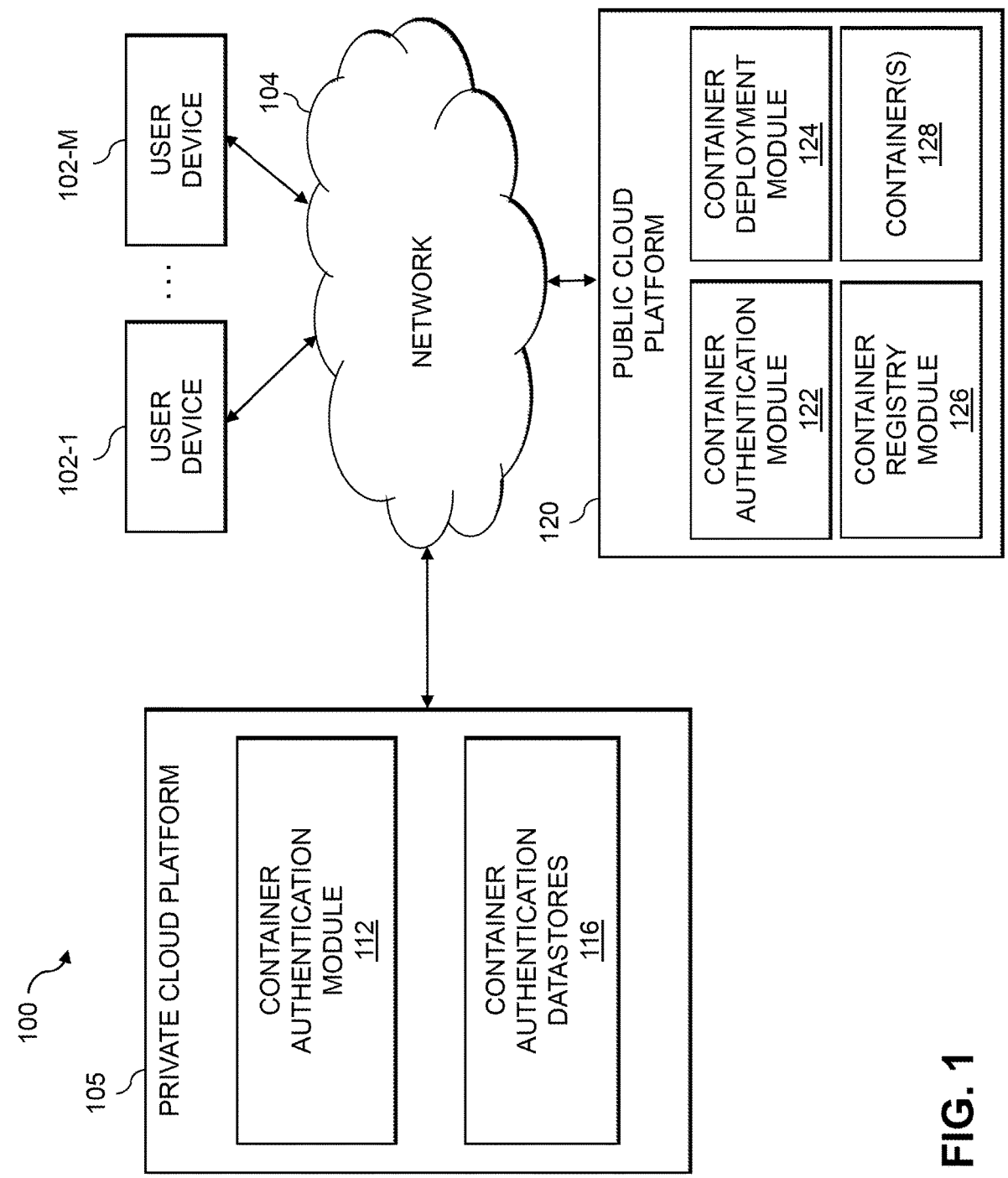
FIG. 1 illustrates an information processing system configured for multi-cloud authentication of data requests in accordance with an illustrative embodiment.

FIG. 1 shows a computer network (also referred to herein as an information processing system) 100 configured in accordance with an illustrative embodiment. The computer network 100 comprises a plurality of user devices 102-1 through 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is a private cloud platform 105 and one or more public cloud platforms 120.

In some embodiments, the private cloud platform 105 can be implemented on the premises of a respective organization, such as part of a data center. In other embodiments, the sensitive data of an organization that is protected using the disclosed techniques for multi-cloud authentication of data requests can be stored in a traditional data center that is not part of a private cloud.

The user devices 102 may comprise, for example, host devices and/or devices such as mobile telephones, laptop computers, tablet computers, desktop computers or other types of computing devices. Such devices are examples of what are more generally referred to herein as "processing devices." Some of these processing devices are also generally referred to herein as "computers." The user devices 102 may comprise a network client that includes networking capabilities such as ethernet, Wi-Fi, etc. When the user devices 102 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices. Such applications illustratively generate input-output (IO) operations that are processed by a storage system. The term "input-output" as used herein refers to at least one of input and output. For example, IO operations may comprise write requests and/or read requests directed to logical addresses of a particular logical storage volume of the storage system. These and other types of IO operations are also generally referred to herein as IO requests.

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The one or more public cloud platforms 120 illustratively comprise processing devices of one or more processing platforms. For example, the public cloud platform 120 can comprise one or more processing devices each having a processor and a memory, possibly implementing virtual machines and/or containers, although numerous other configurations are possible.

The exemplary public cloud platform 120 can be part of cloud infrastructure such as an Amazon Web Services (AWS) system. Other examples of cloud-based systems that can be used to provide at least portions of the one or more public cloud platforms 120 include Google Cloud Platform (GCP), Microsoft Azure, Dell Technologies Cloud, IBM Cloud, Alibaba Cloud and HPe (Hewlett Packard Enterprise) Cloud.

As shown in the example of FIG. 1, the public cloud platform 120 comprises a container authentication module 122, a container deployment module 124, a container registry module 126 and one or more containers 128.

In some embodiments, communications between the user devices 102 (for example, when implemented as host devices) and one or more of the modules 122, 124, 126 and/or containers 128 of the public cloud platform 120 comprise Small Computer System Interface (SCSI) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the user devices 102 to communicate with the public cloud platform 120 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The user devices 102 are configured to interact over the network 104 with one or more of the public cloud platforms 120. Such interaction illustratively includes generating IO operations, such as write and read requests, and sending such requests over the network 104 for processing by one or more of the public cloud platforms 120. In some embodiments, each of the user devices 102 comprises a driver configured to control delivery of IO operations from the host device to one or more of the public cloud platforms 120 over one or more paths through the network 104.

The public cloud platform 120 may further include one or more additional modules and other components typically found in conventional implementations of public cloud storage systems, although such additional modules and other components are omitted from the figure for clarity and simplicity of illustration.

The public cloud platform 120 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the user devices 102 (for example, when implemented as host devices) may be implemented in whole or in part on the same processing platform as the private cloud platform 105, public cloud platform 120 and/or on a separate processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 102, private cloud platform 105, and the public cloud platform 120 to reside in different data centers. Numerous other distributed implementations of the host devices, private cloud platform 105 and the public cloud platform 120 are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

As also depicted in FIG. 1, the private cloud platform 105 further comprises a container authentication module 112 and one or more container authentication datastores 116, as discussed further below, for example, in conjunction with FIG. 2A.

It is to be appreciated that this particular arrangement of container authentication module 112 illustrated in the private cloud platform 105 of the FIG. 1 embodiment is presented by way of example only, and alternative arrangements can be used in other embodiments. For example, the functionality associated with container authentication module 112 in other embodiments can be separated across a larger number of modules. As another example, multiple distinct processors can be used to implement container authentication module 112 or portions thereof.

At least portions of container authentication module 112 may be implemented at least in part in the form of software that is stored in memory and executed by a processor. An exemplary process utilizing container authentication module 112 of an example private cloud platform 105 in computer network 100 will be described in more detail with reference to the flow diagrams of, for example, FIGS. 2C, 4A, 4B and 5.

One or more of the container authentication datastores 116 may employ one or more storage devices (not shown in FIG. 1). The storage devices store data of a plurality of storage volumes, such as respective logical units (LUNs) or other types of logical storage volumes. The term "storage volume" as used herein is intended to be broadly construed, and should not be viewed as being limited to any particular format or configuration.

The user devices 102 and the private cloud platform 105 may be implemented on a common processing platform, or on separate processing platforms. The user devices 102 (for example, when implemented as host devices) are illustratively configured to write data to and read data from one or more of the storage devices on the private cloud platform 105 in accordance with applications executing on those host devices for system users.

The storage devices of the private cloud platform 105 illustratively comprise solid state drives (SSDs). Such SSDs are implemented using non-volatile memory (NVM) devices such as flash memory. Other types of NVM devices that can be used to implement at least a portion of the storage devices include non-volatile RAM (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the private cloud platform 105.

It is therefore to be appreciated that numerous different types of storage devices can be used in the private cloud platform 105 in other embodiments. For example, a given private cloud platform 105 as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as network-attached storage (NAS), storage area networks (SANs), direct-attached storage (DAS) and distributed DAS, as well as combinations of these and other storage types, including software-defined storage.

The private cloud platform 105 can further comprise one or more input-output devices (not shown), which illustratively comprise keyboards, displays or other types of input-output devices in any combination. Such input-output devices can be used, for example, to support one or more user interfaces to the private cloud platform 105, as well as to support communication between the private cloud platform 105 and other related systems and devices not explicitly shown.

The user devices 102 and the private cloud platform 105 in the FIG. 1 embodiment are assumed to be implemented using at least one processing device. Each such processing device generally comprises at least one processor and an associated memory, and implements one or more functional modules for controlling certain features of the private cloud platform 105.

More particularly, user devices 102 and private cloud platform 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the user devices 102, the private cloud platform 105, and/or one or more of the public cloud platforms 120 to communicate over the network 104 with each other (as well as one or more other networked devices), and illustratively comprises one or more conventional transceivers.

It is to be understood that the particular set of elements shown in FIG. 1 for multi-cloud authentication of data requests is presented by way of illustrative example only, and in other embodiments additional or alternative elements may be used. Thus, another embodiment includes additional or alternative systems, devices and other network entities, as well as different arrangements of modules and other components.

For example, while one or more embodiments of the disclosure are illustrated using a private cloud platform 105 and one or more public cloud platforms 120 for the disclosed techniques for multi-cloud authentication of data requests, any combination of cloud environments may be employed to protect the sensitive data stored in the private cloud platform 105. The term "cloud environment," as used herein, shall be broadly construed to encompass public clouds, private clouds, data centers, portions thereof and/or combinations thereof, as those terms are understood by a person of ordinary skill in the art. In a hybrid cloud environment, for example, resources can be shared between a private cloud and one or more public clouds.

In addition, while one or more embodiments of the disclosure are illustrated using containers 128, any virtualized processing environment, such as one or more virtual machines, may be employed to host services that request data in a cloud environment, as would be apparent to a person of ordinary skill in the art.

Figure 2A:
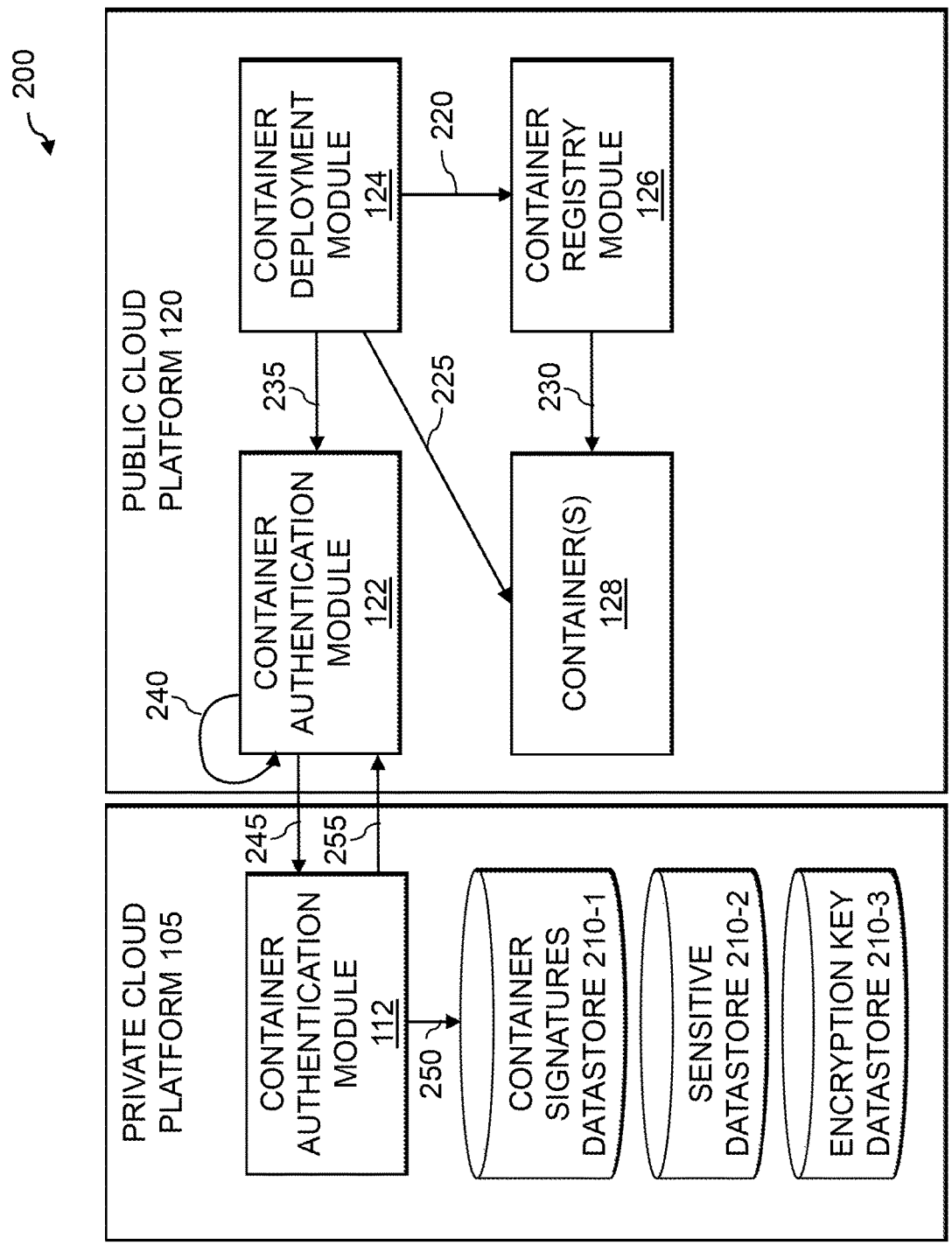
FIGS. 2A and 2B illustrate the private and public cloud platforms of FIG. 1 in a deployment mode and an attack mode, respectively, according to at least one embodiment.

FIG. 2A illustrates the private and public cloud platforms 105, 120 of FIG. 1 in a deployment mode 200, according to at least one embodiment. As shown in FIG. 2A, the one or more container authentication datastores 116 of FIG. 1 are implemented as a container signatures datastore 210-1, a sensitive datastore 210-2 and an encryption key datastore 210-3, each discussed further below.

As noted above and as shown in FIG. 2A, the private cloud platform 105 comprises a container authentication module 112. In addition, the public cloud platform 120 comprises the container authentication module 122, the container deployment module 124, the container registry module 126 and one or more containers 128.

The container authentication module 112 in the private cloud platform 105 interacts with the container authentication module 122 in the public cloud platform 120 in at least some embodiments to implement the disclosed techniques for multi-cloud authentication of data requests.

In an implementation comprising multiple public cloud platforms 120, the container deployment module 124 can be on one or more of the multiple public cloud platforms 120, or on another processing platform. Instances of the container authentication module 122, container registry module 126 and container 128 are implemented on each of the multiple public cloud platforms 120, in at least some embodiments.

The labeled arrows in FIG. 2A are discussed further below in conjunction with the flow diagram of FIG. 2C.

Figure 2B:
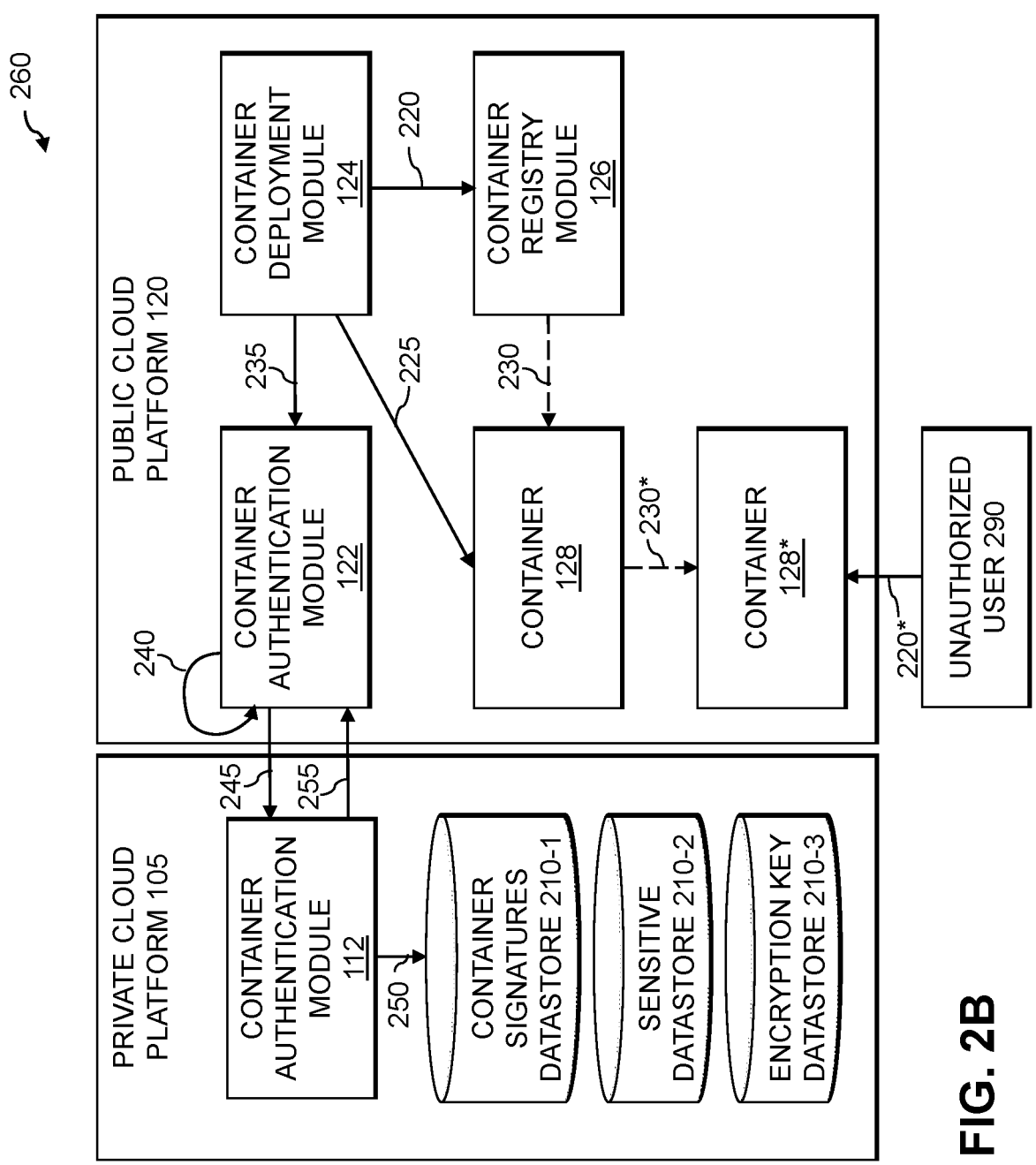

FIG. 2B illustrates the private and public cloud platforms 105, 120 of FIG. 1 in an attack mode 260, according to at least one embodiment. In the example of FIG. 2B (and throughout this disclosure), each element having a same label number as an element of FIG. 2A is implemented in a similar manner as described above in conjunction with FIG. 2A.

The labeled arrows in FIG. 2B are discussed further below in conjunction with the flow diagram of FIG. 2C, in a similar manner as FIG. 2A. In addition, the actions of one or more unauthorized users 290 and unauthorized containers 128* will be discussed further below in conjunction with the flow diagram of FIG. 2C.

Figure 2C:
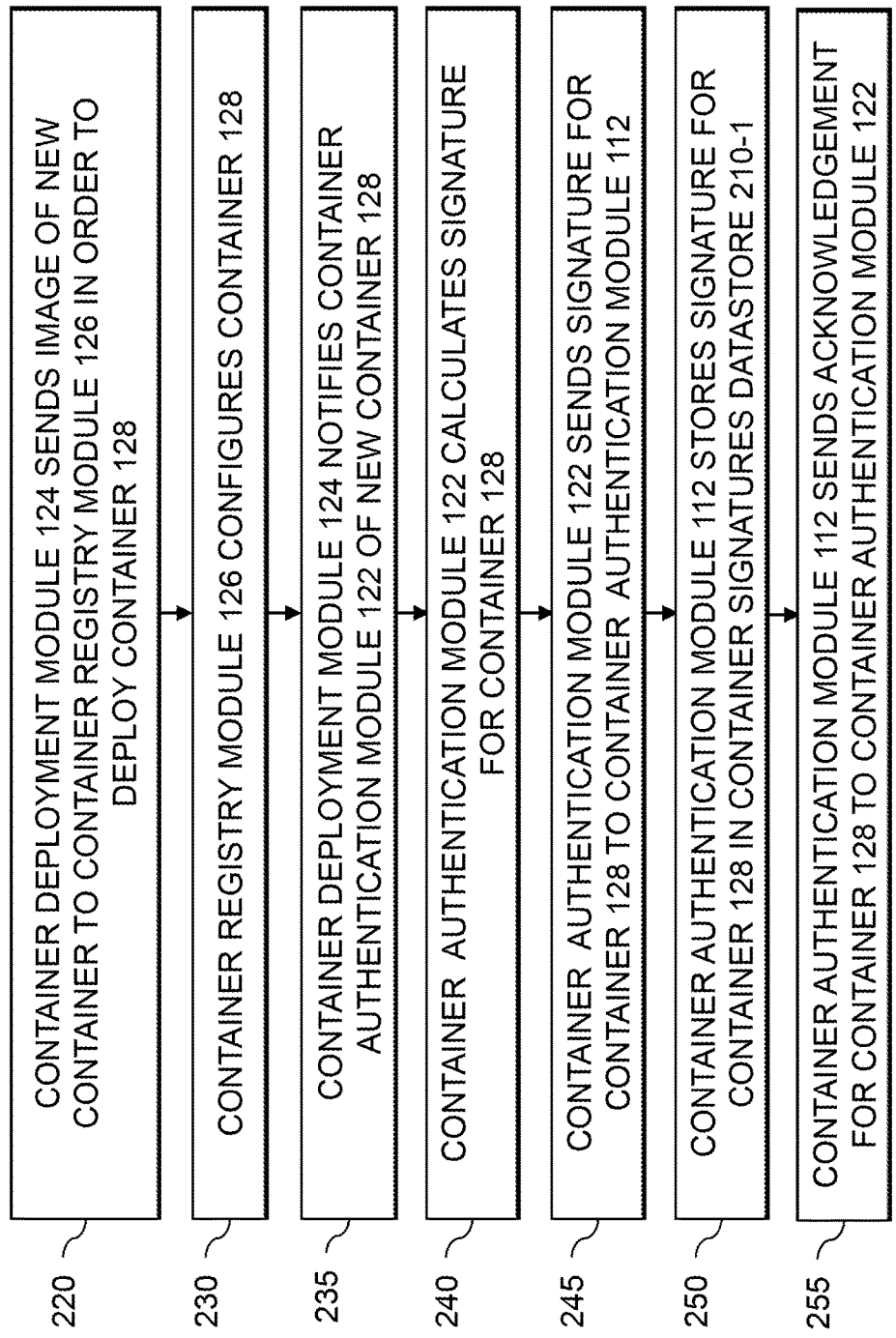
FIG. 2C is a flow diagram illustrating an exemplary implementation of a process for multi-cloud authentication of data requests implemented in the cloud platforms of FIGS. 2A and 2B, according to an embodiment.

FIG. 2C is a flow diagram illustrating an exemplary implementation of a process 275 for multi-cloud authentication of data requests implemented in the cloud platforms 105, 120 of FIGS. 2A and 2B, according to an embodiment. As shown in FIG. 2C, in step 220, the container deployment module 124 sends an image of a new container to the container registry module 126 in order to deploy the new container 128 in step 225. Thereafter, the container registry module 126 configures the container 128 in step 230.

The container deployment module 124 notifies the container authentication module 122 in step 235 of the new container 128. In step 240, the container authentication module 122 calculates a signature for the new container 128. In at least some embodiments, a unique signature is compiled using a number of indicators based on both software and hardware components. The signature may be based on a container identifier, a Basic Input/Output System serial number, a virtual private network identifier, a Media Access Control address of one or more hardware elements, a processing unit serial number, a graphics processing unit serial number, a memory part number, a display serial number, a domain name server identifier, a dynamic host configuration protocol server identifier, and/or an Internet Protocol address.

As shown in FIG. 2C, the container authentication module 122 in the public cloud platform 120 sends the signature for container 128 in step 245 to the container authentication module 112 in the private cloud platform 105 that protects the sensitive data. In step 250, the container authentication module 112 in the private cloud platform 105 stores the signature for container 128 in the container signatures datastore 210-1.

Finally, in step 255, the container authentication module 112 in the private cloud platform 105 sends an acknowledgement for container 128 to the container authentication module 122 in the public cloud platform 120.

It is noted that if an unauthorized user 290 (FIG. 2B) initiates any unauthorized acts via an unauthorized container 128* in step 220*, any attempt to send a request using the unauthorized container 128* will be denied in step 230* (since unauthorized container 128* was not deployed by container deployment module 124 and a deployment notification was not sent by the container deployment module 124 to the container authentication module 122 in step 235 to register the unauthorized container 128*).

Figure 3A:
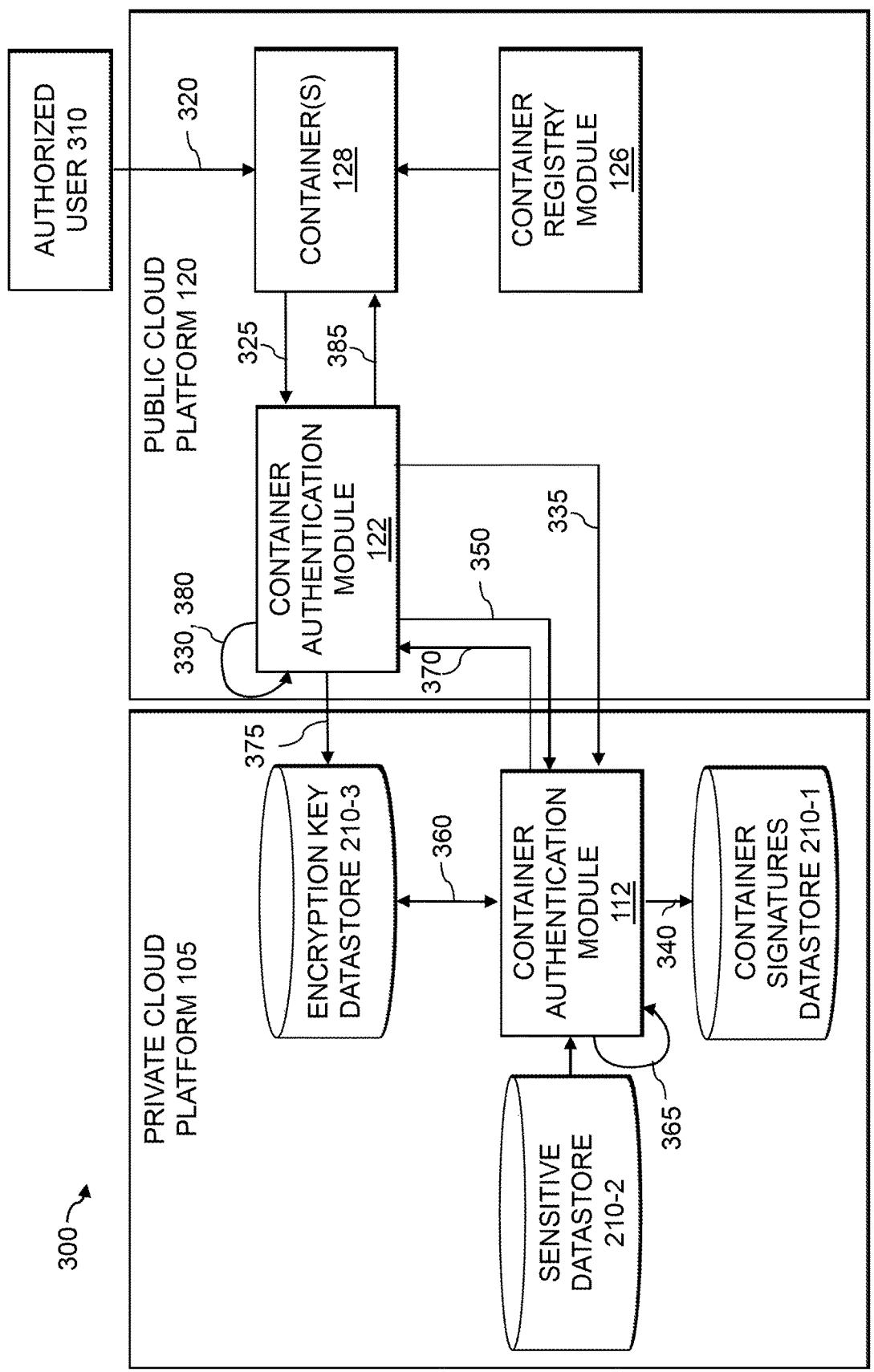
FIGS. 3A and 3B illustrate the private and public cloud platforms of FIG. 1 in an operational mode and an attack mode, respectively, according to one or more embodiments.

FIG. 3A illustrates the private and public cloud platforms 105, 120 of FIG. 1 in an operational mode 300, according to one or more embodiments. In the example of FIG. 3A (and throughout this disclosure), each element having a same label number as an element of FIG. 2A or another figure is implemented in a similar manner as described above, unless otherwise indicated.

The labeled arrows in FIG. 3A are discussed further below in conjunction with the flow diagrams of FIGS. 4A and 4B. In addition, the actions of one or more authorized users 310 will be discussed further below in conjunction with the flow diagram of FIGS. 4A and 4B.

Figure 3B:
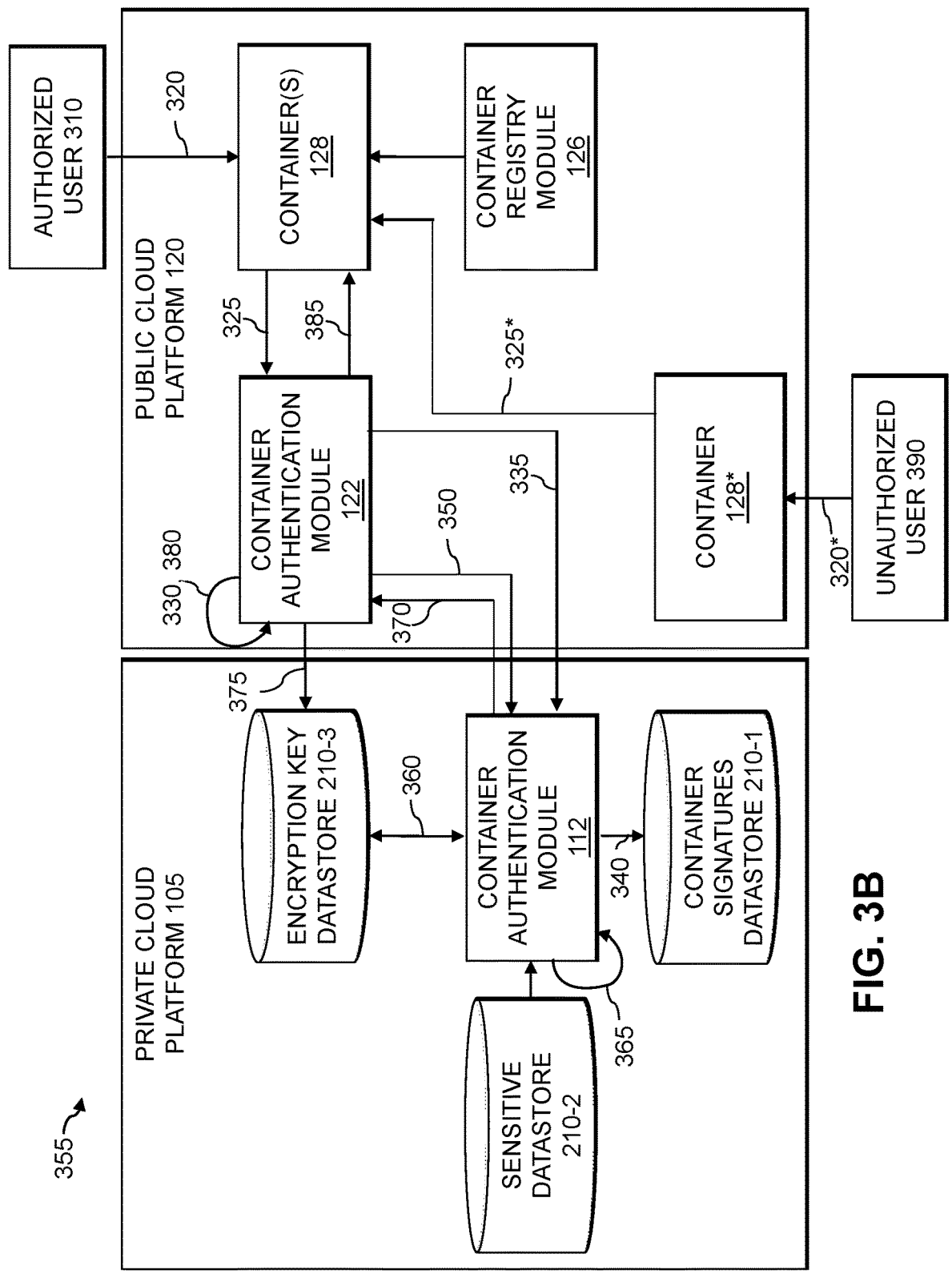

FIG. 3B illustrates the private and public cloud platforms 105, 120 of FIG. 1 in an attack mode 355, according to at least one embodiment. In the example of FIG. 3B (and throughout this disclosure), each element having a same label number as an element of FIG. 3A is implemented in a similar manner as described above in conjunction with FIG. 3A (or FIG. 2A).

The labeled arrows in FIG. 3B are discussed further below in conjunction with the flow diagrams of FIGS. 4A and 4B. In addition, the actions of one or more unauthorized users 390 and unauthorized containers 128* will be discussed further below in conjunction with the flow diagram of FIGS. 4A and 4B.

Figure 4B:
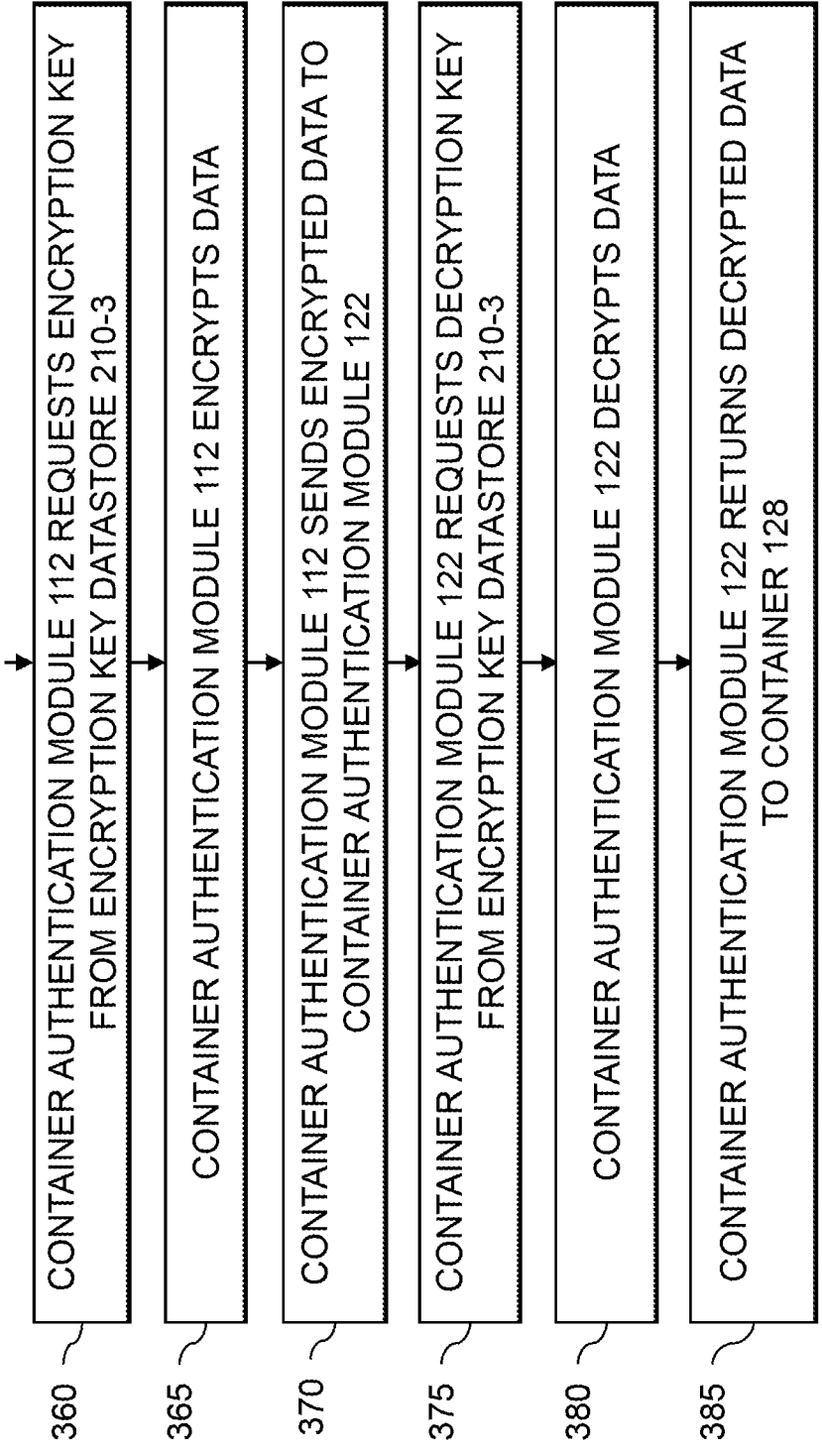

FIGS. 4A and 4B are flow diagrams illustrating, collectively, an exemplary implementation of a process 400 for multi-cloud authentication of data requests implemented in the cloud platforms 105, 120 of FIGS. 3A and 3B, according to some embodiments. As shown in FIG. 4A, in step 320, an authorized user 310 connects to container 128 and requests data. In step 325, the container 128 requests the data from the container authentication module 122 in the public cloud platform 120. The container authentication module 122 then calculates a signature in step 330.

In step 335, the container authentication module 122 sends the calculated signature to the container authentication module 112 in the private cloud platform 105 for verification. The container authentication module 112 then determines in step 340 if the received signature exists in the container signatures datastore 210-1.

If the container signature is verified in step 340 by the container authentication module 112 in the private cloud platform 105, then an acknowledgement may be sent to the container authentication module 122 in the public cloud platform 120 and the container authentication module 122 requests the data from the container authentication module 112 in step 350. It is noted that if the signature is not verified in step 340, then a rejection response can be sent or another remedial action can be taken, as discussed further below. Program control then proceeds to FIG. 4B. The container authentication module 112 in the private cloud platform 105 may obtain the requested data from the sensitive datastore 210-2.

As shown in FIG. 4B, in step 360, the container authentication module 112 in the private cloud platform 105 requests an encryption key from the encryption key datastore 210-3 and encrypts the data in step 365. The container authentication module 112 in the private cloud platform 105 then sends the encrypted data to the container authentication module 122 in the public cloud platform 120 in step 370.

In step 375, the container authentication module 122 requests the decryption key from the encryption key datastore 210-3 in the private cloud platform 105, and decrypts the data in step 380. Finally, the container authentication module 122 returns the decrypted data to the container 128 in step 385.

It is noted that if an unauthorized user 390 (FIG. 3B) initiates any unauthorized acts via the unauthorized container 128*, any attempt to request data using the unauthorized container 128* will be denied in steps 320* and 325*, as shown in FIG. 3B.

FIG. 5 is a flow diagram illustrating an exemplary implementation of a process 500 for multi-cloud authentication of data requests, according to an illustrative embodiment. In the example of FIG. 5, the exemplary multi-cloud authentication process 500 is performed by the container authentication module 122 on the public cloud platform 120.

As shown in FIG. 5, the exemplary multi-cloud authentication process 500 initially obtains a request in step 502 from a service on the public cloud platform 120 for data stored on a second cloud environment (e.g., private cloud platform 105). In step 504, the container authentication module 122 determines a signature for the service, in a similar manner as step 330, discussed above. For example, the signature can be based at least in part on two or more of: a container identifier, a Basic Input/Output System serial number, a virtual private network identifier, a Media Access Control address of one or more hardware elements, a processing unit serial number, a graphics processing unit serial number, a memory part number, a display serial number, a domain name server identifier, a dynamic host configuration protocol server identifier, and/or an Internet Protocol address.

The determined signature for the service is then verified in step 506 by requesting a signature for the service registered with a second authentication entity (e.g., the container authentication module 112) on the second cloud environment (e.g., private cloud platform 105).

In step 508, the container authentication module 122 requests the data from the container authentication module 112 on the private cloud platform 105 in response to the determined signature being verified. The requested data is then provided to the service in step 510.

The particular processing operations and other network functionality described in conjunction with the flow diagrams of FIGS. 2C, 4A, 4B and 5 are presented by way of illustrative example only, and should not be construed as limiting the scope of the disclosure in any way. Alternative embodiments can use other types of processing operations for multi-cloud authentication of data requests. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

Upon detection of an unauthorized data request anomaly (e.g., by a service that is not authenticated), the container authentication module 112 and/or 122 can optionally initiate or execute one or more predefined remedial steps and/or mitigation steps to address the detected anomalies. For example, the predefined remedial steps and/or mitigation steps to address the detected anomalies may comprise the transmission of an alert or alarm to the user device 102 and/or user for important or suspicious events; isolating, removing, quarantining, limiting permissions, analyzing, and deactivating one or more of the user devices 102 and/or one or more files, accounts or aspects of the user devices 102 or the user; notifying one or more third party systems (such as sending an email, or generating an alert in another system); restricting access of one or more accounts and one or more machines or services from accessing a network, files or folders; initiating a step-up authentication with one or more additional authentication factors; resetting or limiting permissions associated with a file or folder; quarantining one or more files or folders, and preventing one or more further actions from being executed associated with the user devices 102, user account, service or machine associated with the detected anomalous activity.

One or more embodiments of the disclosure provide improved methods, apparatus and computer program products for multi-cloud authentication of data requests. The foregoing applications and associated embodiments should be considered as illustrative only, and numerous other embodiments can be configured using the techniques disclosed herein, in a wide variety of different applications.

Among other benefits, the disclosed techniques for multi-cloud authentication of data requests waste the time of a potential attacker, without their knowledge. The disclosed techniques for multi-cloud authentication of data requests break the cyber kill chain by denying access to the protected data, unless the requester is authenticated. In addition, the attacker is not aware of the inherent data protection. In at least some embodiments, the data is stored in the private cloud and the data request authentication is implemented at least in part in the private cloud platform 105. Thus, a service on a public cloud can only obtain the data stored on the private cloud if the data request authentication is approved (e.g., verified) in the private cloud platform 105. In this manner, the security of communications between services and/or cloud environments is strengthened, since data stored on the private cloud may be presented on the public cloud only to approved and/or verified entities or services.

It should also be understood that the disclosed techniques for multi-cloud authentication of data requests, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for multi-cloud authentication of data requests may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based multi-cloud authentication engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based multi-cloud authentication platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
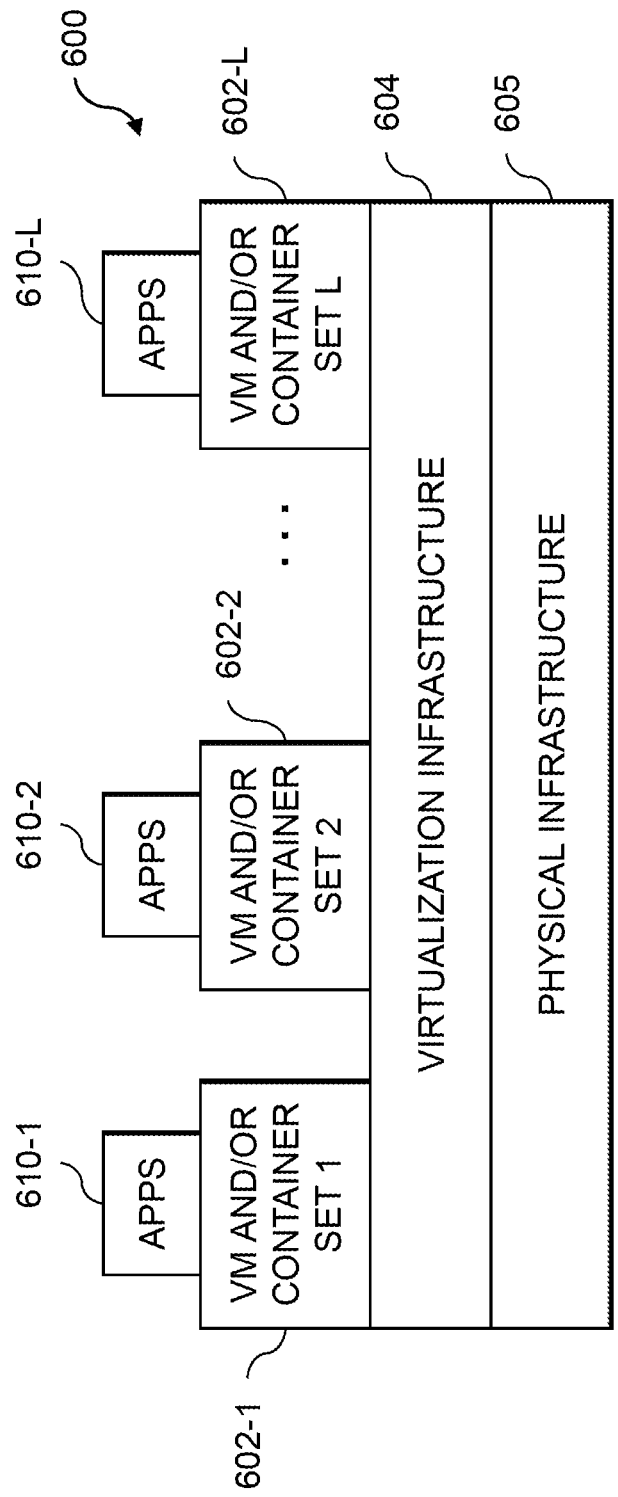
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide multi-cloud authentication functionality of the type described above for one or more processes running on a given one of the VMs. For example, each of the VMs can implement multi-cloud authentication control logic and data protection functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide multi-cloud authentication functionality of the type described above for one or more processes running on different ones of the containers. For example, a container host device supporting multiple containers of one or more container sets can implement one or more instances of multi-cloud authentication control logic and associated data protection functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an ASIC, an FPGA or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
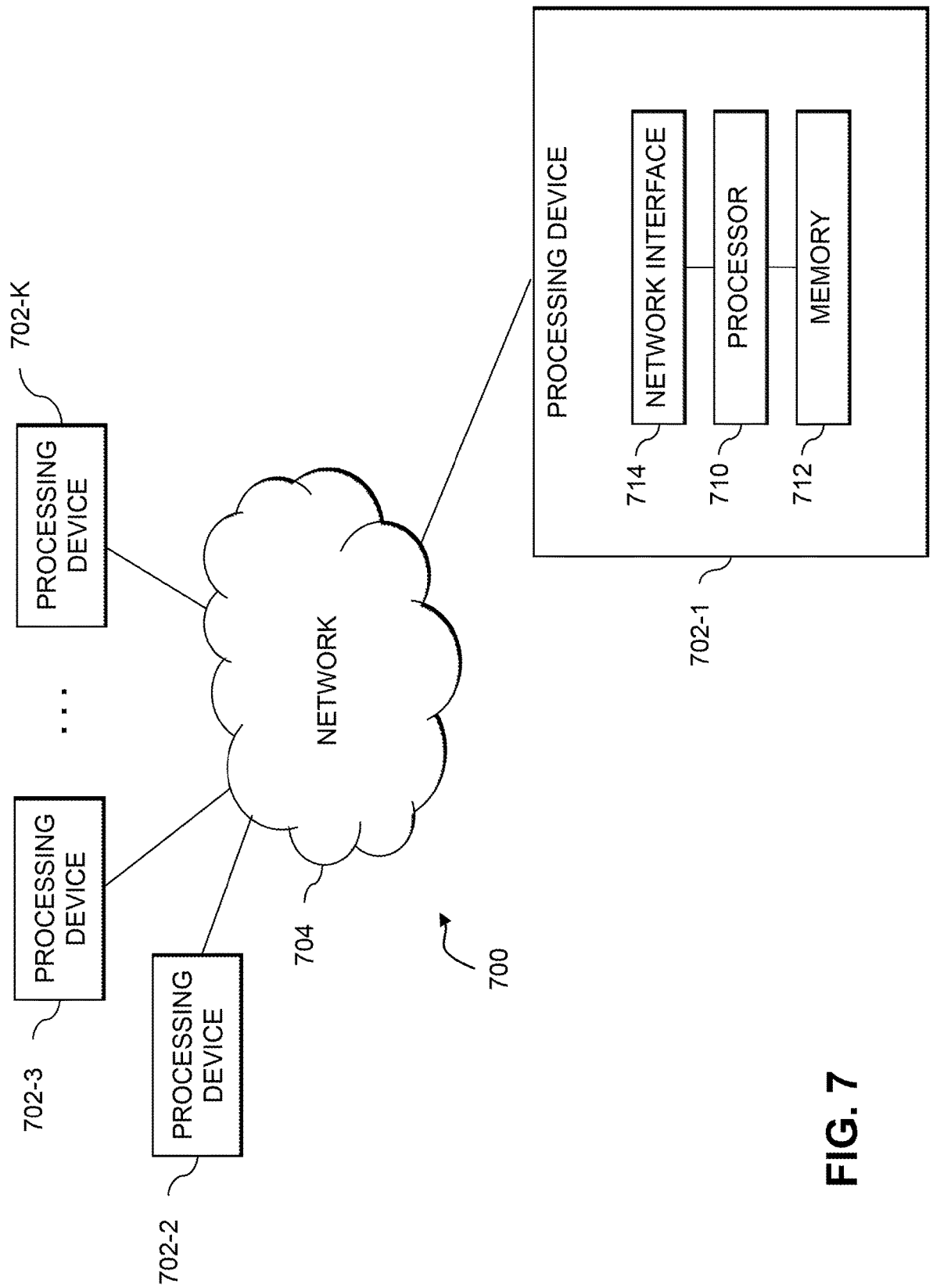
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining, by at least one processing device associated with a first authentication entity of a first cloud environment, from a service on the first cloud environment, a request for data stored by a second cloud environment;
determining, by the at least one processing device associated with the first authentication entity of the first cloud environment, a first signature for the service;
providing, by the at least one processing device associated with the first authentication entity, the first signature for the service to a second authentication entity of the second cloud environment, wherein, prior to obtaining the request for the data stored by the second cloud environment, the at least one processing device associated with the first authentication entity (i) generates a second signature for the service and (ii) interacts with the second authentication entity of the second cloud environment to register the second signature for the service with the second authentication entity of the second cloud environment, and wherein, in response to receiving the first signature for the service, the second authentication entity of the second cloud environment verifies the first signature for the service by comparing the first signature for the service with the second signature for the service, wherein one or more of the first signature and the second signature is based at least in part on at least one of: a container identifier, a Basic Input/Output System identifier, a virtual private network identifier, a Media Access Control address of one or more hardware elements, a processing unit identifier, a graphics processing unit identifier, a memory part number, a display identifier, a domain name server identifier, a dynamic host configuration protocol server identifier, and an Internet Protocol address;

requesting, by the at least one processing device associated with the first authentication entity, the data from the second authentication entity of the second cloud environment in response to the first signature being verified by the second authentication entity of the second cloud environment; and providing the requested data to the service;

wherein the method is performed by the at least one processing device, associated with the first authentication entity of the first cloud environment, comprising a processor coupled to a memory.

2. The method of claim 1, wherein the requested data from the second cloud environment is encrypted with an encryption key, and further comprising decrypting the requested data from the second cloud environment with a decryption key obtained from the second cloud environment.

3. The method of claim 1, wherein the one or more of the first signature and the second signature is based at least in part on two or more of the container identifier, a Basic Input/Output System serial number, the virtual private network identifier, the Media Access Control address of one or more hardware elements, a processing unit serial number, a graphics processing unit serial number, the memory part number, a display serial number, the domain name server identifier, the dynamic host configuration protocol server identifier, and the Internet Protocol address.

4. The method of claim 1, further comprising performing one or more automated remedial actions in response to the first signature not being verified.

5. The method of claim 1, wherein the second signature for the service is registered as part of a deployment of the service.

6. The method of claim 5, further comprising storing the second signature for the service in a datastore associated with the second cloud environment as part of the deployment of the service.

7. The method of claim 1, wherein the first cloud environment comprises a public cloud and wherein the second cloud environment comprises a private cloud.

8. An apparatus comprising:
at least one processing device, associated with a first authentication entity of a first cloud environment, comprising a processor coupled to a memory;
the at least one processing device being configured to implement the following steps:
obtaining, by the at least one processing device associated with the first authentication entity of the first cloud environment, from a service on the first cloud environment, a request for data stored by a second cloud environment;

determining, by the at least one processing device associated with the first authentication entity of the first cloud environment, a first signature for the service;

providing, by the at least one processing device associated with the first authentication entity, the first signature for the service to a second authentication entity of the second cloud environment, wherein, prior to obtaining the request for the data stored by the second cloud environment, the at least one processing device associated with the first authentication entity (i) generates a second signature for the service and (ii) interacts with the second authentication entity of the second cloud environment to register the second signature for the service with the second authentication entity of the second cloud environment, and wherein, in response to receiving the first signature for the service, the second authentication entity of the second cloud environment verifies the first signature for the service by comparing the first signature for the service with the second signature for the service, wherein one or more of the first signature and the second signature is based at least in part on at least one of: a container identifier, a Basic Input/Output System identifier, a virtual private network identifier, a Media Access Control address of one or more hardware elements, a processing unit identifier, a graphics processing unit identifier, a memory part number, a display identifier, a domain name server identifier, a dynamic host configuration protocol server identifier, and an Internet Protocol address;

requesting, by the at least one processing device associated with the first authentication entity, the data from the second authentication entity of the second cloud environment in response to the first signature being verified by the second authentication entity of the second cloud environment; and providing the requested data to the service.

9. The apparatus of claim 8, wherein the requested data from the second cloud environment is encrypted with an encryption key, and further comprising decrypting the requested data from the second cloud environment with a decryption key obtained from the second cloud environment.

10. The apparatus of claim 8, wherein the one or more of the first signature and the second signature is based at least in part on two or more of the container identifier, a Basic Input/Output System serial number, the virtual private network identifier, the Media Access Control address of one or more hardware elements, a processing unit serial number, a graphics processing unit serial number, the memory part number, a display serial number, the domain name server identifier, the dynamic host configuration protocol server identifier, and the Internet Protocol address.

11. The apparatus of claim 8, further comprising performing one or more automated remedial actions in response to the first signature not being verified.

12. The apparatus of claim 8, wherein the second signature for the service is registered as part of a deployment of the service.

13. The apparatus of claim 12, further comprising storing the second signature for the service in a datastore associated with the second cloud environment as part of the deployment of the service.

14. The apparatus of claim 8, wherein the first cloud environment comprises a public cloud and wherein the second cloud environment comprises a private cloud.

15. A non-transitory processor-readable storage medium having stored therein program code of one or more software programs, wherein the program code when executed by at least one processing device, associated with a first authentication entity of a first cloud environment, causes the at least one processing device to perform the following steps:

obtaining, by the at least one processing device associated with the first authentication entity of the first cloud environment, from a service on the first cloud environment, a request for data stored by a second cloud environment;

determining, by the at least one processing device associated with the first authentication entity of the first cloud environment, a first signature for the service;

providing, by the at least one processing device associated with the first authentication entity, the first signature for the service to a second authentication entity of the second cloud environment, wherein, prior to obtaining the request for the data stored by the second cloud environment, the at least one processing device associated with the first authentication entity (i) generates a second signature for the service and (ii) interacts with the second authentication entity of the second cloud environment to register the second signature for the service with the second authentication entity of the second cloud environment, and wherein, in response to receiving the first signature for the service, the second authentication entity of the second cloud environment verifies the first signature for the service by comparing the first signature for the service with the second signature for the service, wherein one or more of the first signature and the second signature is based at least in part on at least one of: a container identifier, a Basic Input/Output System identifier, a virtual private network identifier, a Media Access Control address of one or more hardware elements, a processing unit identifier, a graphics processing unit identifier, a memory part number, a display identifier, a domain name server identifier, a dynamic host configuration protocol server identifier, and an Internet Protocol address;

requesting, by the at least one processing device associated with the first authentication entity, the data from the second authentication entity of the second cloud environment in response to the first signature being verified by the second authentication entity of the second cloud environment; and providing the requested data to the service.

16. The non-transitory processor-readable storage medium of claim 15, wherein the requested data from the second cloud environment is encrypted with an encryption key, and further comprising decrypting the requested data from the second cloud environment with a decryption key obtained from the second cloud environment.

17. The non-transitory processor-readable storage medium of claim 15, wherein the one or more of the first signature and the second signature is based at least in part on two or more of the container identifier, a Basic Input/Output System serial number, the virtual private network identifier, the Media Access Control address of one or more hardware elements, a processing unit serial number, a graphics processing unit serial number, the memory part number, a display serial number, the domain name server identifier, the dynamic host configuration protocol server identifier, and the Internet Protocol address.

18. The non-transitory processor-readable storage medium of claim 15, further comprising performing one or more automated remedial actions in response to the first signature not being verified.

19. The non-transitory processor-readable storage medium of claim 15, wherein the second signature for the service is registered as part of a deployment of the service.

20. The non-transitory processor-readable storage medium of claim 15, wherein the first cloud environment comprises a public cloud and wherein the second cloud environment comprises a private cloud.

\* \* \* \* \*